Oct. 27, 1959 C. KOCH 2,909,974
PHOTOGRAPHIC CAMERA
Filed Jan. 11, 1956 3 Sheets-Sheet 1

INVENTOR.
Carl Koch
BY Michael S. Striker

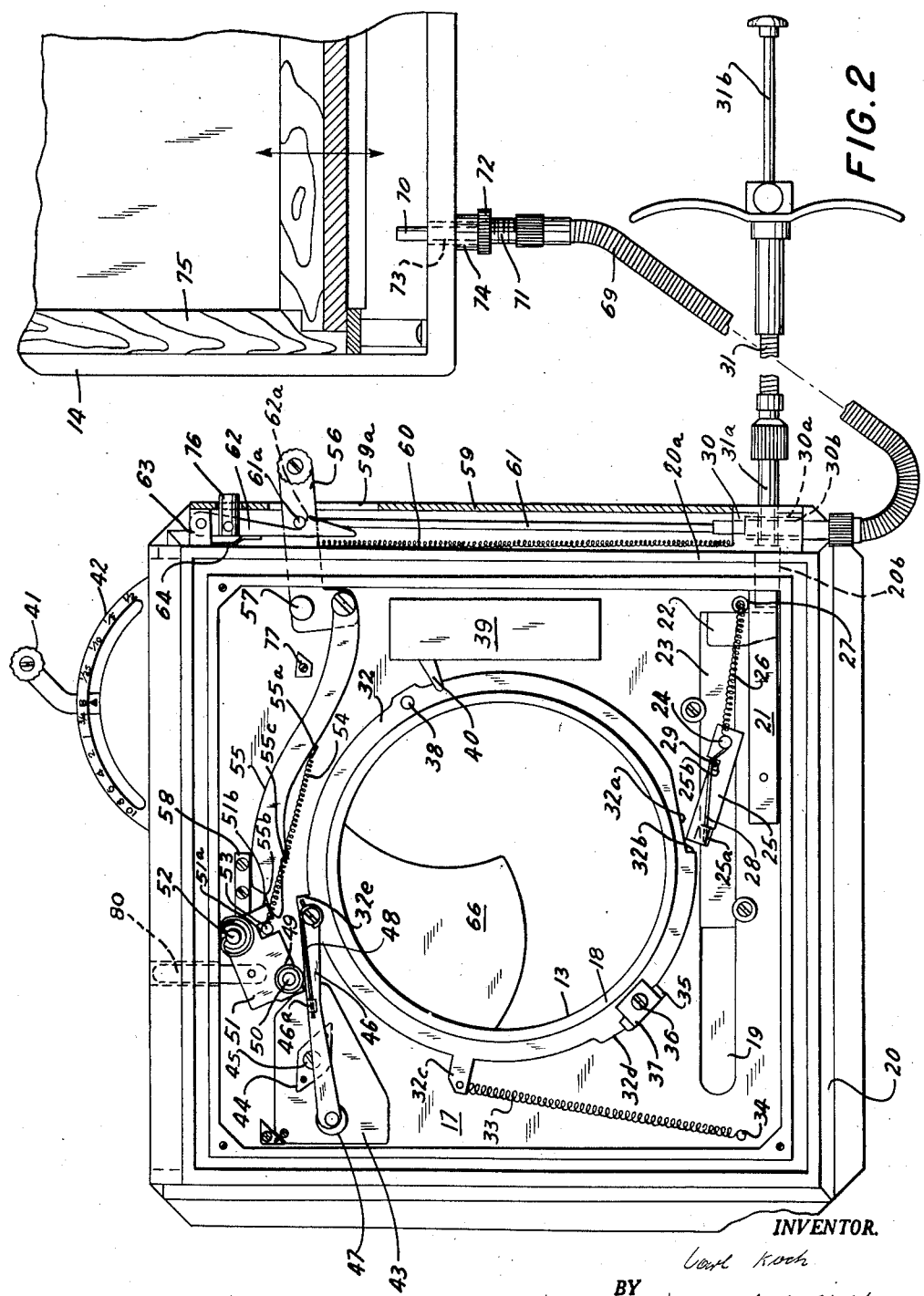

Oct. 27, 1959  C. KOCH  2,909,974
PHOTOGRAPHIC CAMERA

Filed Jan. 11, 1956  3 Sheets-Sheet 3

INVENTOR.
Carl Koch
BY Michael S. Striker
agt.

United States Patent Office 2,909,974
Patented Oct. 27, 1959

2,909,974

PHOTOGRAPHIC CAMERA

Carl Koch, Schaffhausen, Switzerland

Application January 11, 1956, Serial No. 558,482

Claims priority, application Germany October 9, 1951

10 Claims. (Cl. 95—11)

The present invention relates to cameras.

This application is a continuation-in-part of co-pending application, Serial Number 278,395, filed March 25, 1952, and entitled Photographic Camera, now abandoned.

The present invention relates, more particularly, to cameras such as single-lens reflex cameras and portrait cameras where the image viewed on the ground glass arrives at the latter through the same objective which is used for exposing the film or slide.

For example, in a portrait camera a light sensitive slide protected against exposure by a suitable covering sheath can be placed in the camera only after the subject to be photographed has been viewed on the ground glass, and then the shutter which is necessarily opened for viewing purposes must be closed, the sheath removed, the exposure made, the sheath replaced on the exposed slide, and then the latter is removed together with the sheath. Such conventional operation is very time consuming, inconvenient and easily lends itself to errors in operation unless the operator concentrates on the steps which are performed. As a result, the operator cannot devote his full concentration on the subject being photographed, and this factor makes portrait photography very difficult because the subject is likely to move and it is only possible to make the exposure at an appreciable time after the components of the photograph have been composed on the viewing screen.

One of the objects of the present invention is to overcome the above drawbacks by providing a shutter operating arrangement which makes it possible to perform the actual picture taking steps in an extremely short time which is only a small fraction of the time required to perform these steps with a conventional camera.

Another object of the present invention is to reduce the possibility of error by providing an arrangement where the shutter is automatically placed in its open position whenever the light sensitive member is away from its picture taking position and automatically placed in its closed position whenever the light sensitive member is placed in its picture taking position.

A further object of the present invention is to provide an extremely flexible camera arrangement which may be operated in a conventional manner as described above, in a fully automatic manner, or manually but much faster than the conventional manner.

An additional object of the present invention is to incorporate the structure of the invention into a shutter unit which forms a subassembly capable of being conveniently incorporated into an otherwise conventional camera.

Still another object of the present invention is to provide structure for accomplishing all of the above objects which is rugged, inexpensive, easy to manufacture and assemble, precise in operation, and in no way a limitation on the operation of the camera.

With the above objects in view the present invention mainly consists of a camera which includes a support means carrying adjacent the rear of the camera a viewing means extending across the optical axis and providing an image of the subject to be photographed. Forwardly of the viewing means the support means carries a shutter means also extending across the optical axis and movable between open and closed positions, the image being viewed at the viewing means when the shutter means is in its open position. Between the shutter means and viewing means but adjacent the latter the support means carries a guide means for guiding a light sensitive member to a picture taking position. A manually operable means is provided for first placing the shutter means in its closed position and then tripping the shutter to expose the light sensitive member for a given length of time. Also, a means is provided for placing the shutter means in its closed position in a fully automatic manner when the light sensitive member is in its picture taking position and for placing the shutter means in its open position in a fully automatic manner when the light sensitive member is away from its picture taking position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a partly diagrammatic front elevational showing the details of the structure of the present invention;

Figure 1:
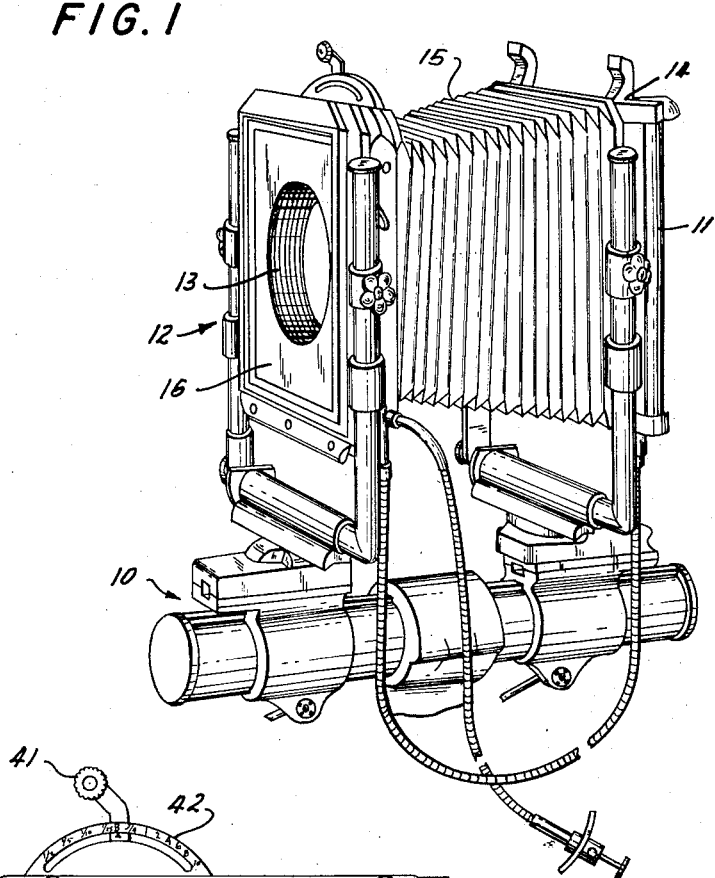
Fig. 1 is an elevational view of part of a camera incorporating the structure of the present invention.

The structure of the present invention is capable of being used in a single lens reflex camera, but for the sake of illustrating the invention, a portrait camera adaptedt o expose light sensitive slides is shown in the drawings and described below in connection with the present invention.

Thus, referring to Fig. 1 it will be seen that a support means 10 in the form of a framework on which the camera parts are adjustable carries at the rear of the camera a viewing means 11 in the form of a ground glass screen at which the image is viewed. Forwardly of the viewing means 11 the support means 10 carries a shutter means 12, the details of which are described below. The objective is not shown in Fig. 1 in order to clearly illustrate the threaded opening 13 on which the objective is removably mounted. Between the shutter means 12 and the viewing means 11 and closely adjacent to the latter the support means 10 carries a guide means 14 for guiding a light sensitive member in the form of a slide in the illustrated example to and from its picture taking position. A bellows 15 is connected in a light-tight manner at its front end to the rear of a shutter means 12 and at its rear end to the front of the guide means 14. The shutter assembly together with the unillustrated objective is capable of movement on the support means 10 back and forth along the optical axis for focusing purposes.

It will be noted from Fig. 1 that a front wall 16 covers the structure of the shutter means 12. This structure is shown in a front view in Fig. 2 with the front wall 16 removed to illustrate the structure behind this front wall. Thus, referring to Fig. 2 it will be seen that the shutter assembly includes its own support means in the form of a frame provided with a wall 17 carrying the structure of the shutter assembly. Thus, this wall 17 carries the sleeve 18 which is threaded at its inner face and which extends forwardly from the wall 17 to provide the threaded opening 13 which receives the objective, the optical axis passing through the center of the opening 13 and being normal to the plane of Fig. 2. The wall 17 is formed in its front face with an elongated groove 19, and forwardly of and parallel to the wall 17 the frame 20 fixedly carries a strip 21 which thus forms with the wall 17 a guide passage into which a guide member 22 extends for shifting movement to the left and right, as viewed in Fig. 2. The guide member 22 is fixedly connected to the front face of a bar 23 slidable to the left and right, as viewed in Fig. 2, in the groove 19. The bar 23 carries a pivot pin 24 on which a lever 25 is pivotally mounted adjacent its right end, as viewed in Fig. 2. The bar 23 has substantially the same thickness as the depth of groove 19 so that the front face of bar 23 is substantially flush with the front face of wall 17, and the pivot pin 24 extends forwardly from the bar 23 so that the lever 25 is turnable in a plane closely adjacent to the front face of wall 17. A spring 26 is fixed at its left end, as viewed in Fig. 2, to the pivot pin 24 forwardly of the lever 25 and at its right end, as viewed in Fig. 2, to a stud 27 fixed to and extending forwardly from the wall 17, so that the spring 26 urges bar 23 to the right, as viewed in Fig. 2, to a rest position where the guide member 22 engages the stud 27 which thus acts also as a stop determining the rest position of bar 23 and lever 25. A wire spring 28 is coiled at one end about and fixed to the pivot pin 24, and the opposite left free end of spring 28, as viewed in Fig. 2, extends beneath and engages a forwardly extending tongue 25a of the lever 25 so that the spring 28 urges the lever 25 in a clockwise direction about pivot pin 24, as viewed in Fig. 2. The lever 25 is formed with a notch 25b extending downwardly from the upper edge of lever 25, and a pin 29 is fixed to the bar 23 and extends into this notch to limit the upward turning movement of the lever 25 which is however free to turn against the force of spring 28 in a counterclockwise direction, as viewed in Fig. 2.

The right part 20a of the frame 20, as viewed in Fig. 2, is formed with a bore 20b aligned with the guide member 22. A block 30 is fixed to the outer right face of frame part 20a, as viewed in Fig. 2, and is formed with a threaded bore 30a aligned with the bore 20b. A Bowden cable 31 carries at its left end, as viewed in Fig. 2, an outwardly threaded freely turnable sleeve 31a which is in threaded engagement with the bore 30a, so that the operator may move the shiftable plunger member 31b in order to engage guide member 22 and shift bar 23 together with the parts carried thereby to the left, as viewed in Fig. 2, against the influence of the spring 26 which automatically returns these parts to their rest position shown in Fig. 2 when the operator releases the plunger member 31b.

A ring 32 is turnably carried by the outer face of sleeve 18 next to the front face of wall 17 and in the same plane as the lever 25. The outer periphery of the ring 32 is formed with a cutout 32a providing the ring 32 with a projection 32b located just to the left of the lever 25 in the position of the parts shown in Fig. 2. The ring 32 furthermore is provided with a rigid projecting part 32c to which one end of a spring 33 is connected, the other end of this spring is fixed to a stud 34 extending forwardly from and fixed to the wall 17 so that the spring 33 urges the ring 32 to turn in a counterclockwise direction on sleeve 18 and about the optical axis, as viewed in Fig. 2. The ring 32 is furthermore provided with a peripheral projecting portion 32d which engages a rubber stop member 35 to determine the rest position of the ring 32 under the influence of the spring 33. The rubber stop member 35 is fixed to the front face of the wall 17 by a screw member 36 which passes through a plate 37 pressed by the screw member 36 against the front face of the rubber block 35 and extending freely over the front face of ring 32 without in any way retarding the free turning movement thereof. The ring 32 also is provided with a projecting portion 32e for a purpose described below, and the ring 32 fixedly carries a forwardly projecting pin 38.

To the right of the ring 32 the wall 17 carried a timing mechanism 39 of a conventional known structure, this timing mechanism including a turnable projecting member 40 located in the path of movement of the pin 38 and extending freely over the front face of the ring 32. The arrangement is such that as the ring 32 turns in a clockwise direction, as viewed in Fig. 2, the pin 38 engages the ring 40 to turn the latter in a counterclockwise direction, as viewed in Fig. 2, thus cocking the timing mechanism 39 and then the pin 38 passes downwardly beyond the member 40. During the return movement of the ring 32 under the influence of spring 33 the pin 38 engages the lower face of member 40, as viewed in Fig. 2, and the timing mechanism retards the return movement of the ring 32 until the pin 38 moves beyond the tip of member 40. The position of member 40 is adjusted in a known way for regulating the exposure time, and this adjustment is effected by a lever 41 accessible at the top of the shutter assembly and freely turnable between a pair of walls 42 one of which is visible in Fig. 2 and the other of which is visible in Figs. 4 and 5. Along their upper peripheries the walls 42 carry exposure time indicia which cooperates with an index on the front and rear faces of lever 41 to indicate to the operator the exposure time for which the camera is set. The mechanism which interconnects lever 41 with the member 40 is omitted from the drawings for the sake of clarity, this mechanism being purely conventional and forming no part of the present invention. This mechanism is carried by the wall 17 but does not in any way affect the operation of the parts described above and below, with the exception of the timing mechanism 39 and the projecting member 40. Turning of the lever 41 by the operator positions the member 40 so that it will engage pin 38 and retard return movement of ring 32 for a greater or lesser period of time depending on the setting of manually operable lever 41.

A plate 43 is fixed to the front face of wall 17 and carries a rhombus-shaped camming member 44 fixed to the plate 43 by a screw 45. An elongated means in the form of a lever 46 is turnably connected at its right end, as viewed in Fig. 2, to the front face of ring 32 just to the left of the projecting portion 32e thereof, as viewed in Fig. 2. This lever 46 extends freely across and in front of the cam 44 and carries at its left free end a freely turnable follower roller 47 adapted to cooperate with the cam 44 and located in the same plane as the latter. Thus, the follower roller 47 is located between lever 46 and plate 43. A wire spring 48 is fixed at its right end to the pivot pin turnably connecting lever 46 to ring 32, and this wire spring is coiled about the pivot pin and extends to the left from the pivot pin, as viewed in Fig. 2, to a position beneath a forwardly extending tongue 46a rigid with the lever 46, so that the spring 48 urges the lever 46 to turn in a clockwise direction, as viewed in Fig. 2.

The upper edge of lever 46 is located beneath a roller 49 which is carried for free turning movement on a pin 50 fixed to and extending forwardly from a lever 51 which is turnably carried at its upper right portion, as viewed in Fig. 2, by a pivot pin 52 fixed to and extending forwardly from the plate 17. This lever 51 is formed with a notch 51a extending upwardly from its bottom edge, and a pin 53 extends into this notch. The pin 53 is fixed to a ring described below for actuating the shutter blades and extends through a cut away portion of the plate 17 which is large enough to permit the pin 53 to turn about the optical axis through an angle sufficient to place the shutter in its open and closed positions.

A spring 54 is connected at one end to the pin 53 and at its opposite end to a tongue 55a rigid with and extending forwardly from a motion transmitting member 55 which is pivotally connected at its right end, as viewed in Fig. 2, to one arm of a bell crank lever 56 which is pivotally carried by a pivot pin 57 fixed to and extending forwardly from the wall 17. The right frame portion 20a of Fig. 2 is formed with an elongated slot through which the lever 56 freely passes and large enough to allow the lever 56 to turn freely between the positions thereof shown in Figs. 2 and 3. The left free end portion of the lever 55 is stepped as shown in Fig. 2 to form at this end portion of lever 55 a sharp corner 55b which cooperates in a manner described below with the lower right corner 51b of the lever 51, as viewed in Fig. 2. The lever 55 is carried only by the lever 56, and the spring 54 urges the motion transmitting member 55 to the left, as viewed in Fig. 2, while through the pin 53 spring 54 acts on lever 51 to urge corner 51b thereof to the right, as viewed in Fig. 2, so that in this way the lever 51 and motion transmitting member 55 are urged by spring 54 toward a position engaging each other. The spring 54 also acts on pin 53 to urge the shutter to its open position, as will be apparent from the description which follows.

The wall 17 fixedly carries at its front face a stop member 58 which engages the lever 51 to limit the counterclockwise turning movement thereof, as viewed in Fig. 2, lever 51 being shown in Fig. 2 in engagement with the stop 58. It will also be noted from Fig. 2 that in the position of the parts shown the spring 54 urges the edge of motion transmitting member 55 just to the left of corner 55b upwardly against the lower edge of the lever 51.

A housing portion 59 is fixed to and extends laterally from the right frame portion 20a of frame 20 to define with the latter an inner space in which is located a spring 60 fixed at its top end, as viewed in Fig. 2, to the bell crank lever 56 and at its bottom end to the block 30, so that the spring 60, which is much stronger than the spring 54, urges the lever 56 to turn in a clockwise direction, as viewed in Fig. 2. It will be noted that the outer wall of housing portion 59 is provided with an elongated slot 59a through which bell crank 56 freely passes. This slot 59a is long enough to permit unrestricted movement of lever 56 between its end positions respectively illustrated in Figs. 2 and 3. An elongated rod 61 is freely slidable at its bottom end portion in an elongated bore 30b formed in the block 30 and located entirely to the rear of the bore 30a, as viewed in Fig. 2, so that in this way the bore 30b guides the rod 61 for substantially vertical movement. The top end of the rod 61 is bent forwardly and passes through an opening in the bell crank 56 so that the latter is provided with a forwardly extending pin portion 61a forming a catch. This catch 61a cooperates with a pawl 62 turnably suspended at its top end from a block 63 forming the top wall of housing portion 59 and fixed to the frame portion 20a. The pawl 62 has between its ends a projecting portion 62a which extends beneath the catch portion 61a at the front side of lever 56 to maintain the lever 56 in the position of the parts shown in Fig. 2 against the force of the spring 60. A leaf spring 64 is fixed to the side frame portion 20a and engages the pawl 62 to urge the latter in a counterclockwise direction, as viewed in Fig. 2. When the catch 61a is out of engagement with pawl 62 and lever 56 released to the spring 60, the parts move to the position indicated in Fig. 3 where the pawl 62 engages frame portion 20a before the catch 61a moves downwardly beyond the bottom end of pawl 62, so that frame portion 20a acts as a stop limiting the clockwise turning movement of pawl 62 and guaranteeing that the latter is in constant engagement with the catch 61a.

A warning flag of a bright color such as red is provided to indicate to the operator when the shutter is in its open position. Thus, the warning flag 80 is vertically slidable through a suitable cutout formed in the top portion of frame 20 and is located just forwardly of the front face of wall 17. The flag 80 is pivotally connected at its bottom end to the lever 51 and is made of a thin sheet metal so that it fits freely between lever 51 and wall 17 without retarding turning movement of lever 51. The cutout through which flag 80 passes to the exterior of the shutter assembly is wide enough to allow unrestricted vertical movement of the flag during turning of lever 51 between the positions indicated in Figs. 2 and 3. It will be noted that in Fig. 2 where the lever 51 is in the shutter closing position the flag 80 does not extend beyond the top of frame 20, while in Fig. 3 where lever 51 is in the shutter opening position the flag 80 extends through a substantial distance upwardly beyond frame 20 to indicate to the operator that the shutter is open.

Figure 5:
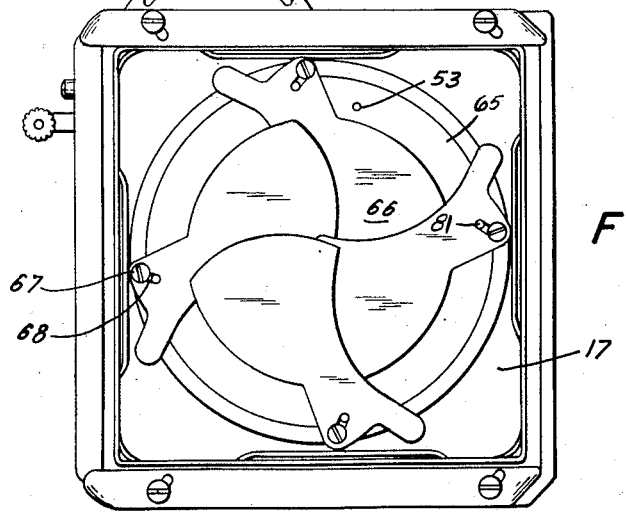
Fig. 5 shows the structure of Fig. 4 with the shutter blades in their closed position.
Figure 3:
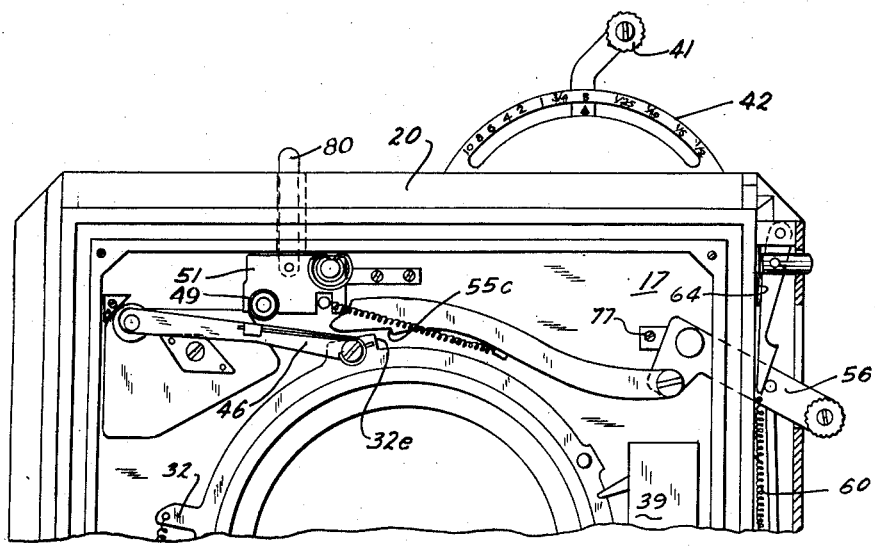
Fig. 3 shows part of the structure of Fig. 2 in a position different from that of Fig. 2.
Figure 4:
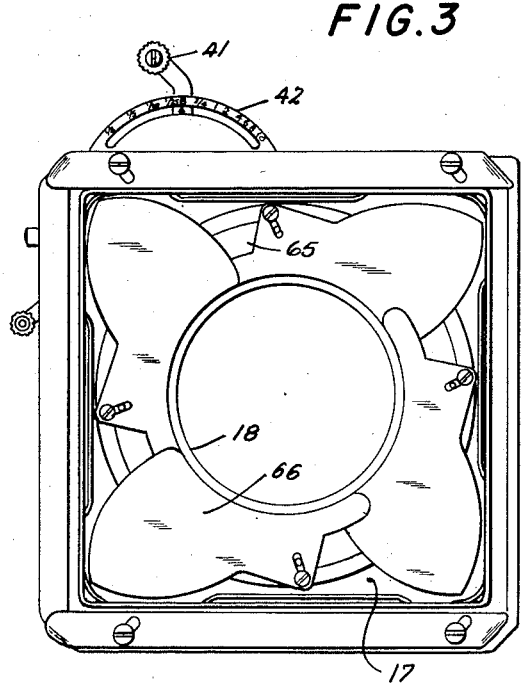
Fig. 4 is an elevational view showing the shutter blades in their open position.

The shutter assembly is provided, as indicated in Figs. 4 and 5 with a ring 65 freely turnable on the sleeve 18 and located adjacent the rear end thereof. The face of ring 65 shown in Figs. 4 and 5 is substantially flush with the rear end of sleeve 18 and with the face of wall 17 shown in Figs. 4 and 5, the latter being provided with an annular recess in its rear face shown in Figs. 4 and 5 surrounding the sleeve 18 and receiving the ring 65. The pin 53 is fixed to the ring 65 and extends forwardly therefrom into the notch 51a of lever 51, as described above. This pin 53 does not extend beyond the face of ring 65 shown in Fig. 5. The shutter blades 66 are also shown in Figs. 4 and 5, these shutter blades being respectively pivoted to the wall 17 at the rear face thereof by the pivot pins 67 which are displaced from each other by 90°, as shown in Figs. 4 and 5. Each of the blades 66 is formed with an elongated slot 68 extending from pivot pin 67, and a plurality of pins 81 are fixed to the ring 65 and respectively extend into the slots 68 so that when the ring 65 is turned in a clockwise direction, as viewed in Fig. 5 the shutter blades will be moved from the closed position of Fig. 5 to the open position of Fig. 4, while when the ring 65 moves in a counterclockwise direction as viewed in Fig. 4 the blades will be returned to their closed position shown in Fig. 5. Thus, it will be seen that Figs. 2 and 5 show the shutter in its closed position, only one of the blades 66 being indicated in Fig. 2, while Figs. 3 and 4 show the shutter in its open position.

In accordance with the present invention another Bowden cable 69 may be threadedly connected to a threaded portion of the bore 30b to place the shiftable plunger 70 of cable 69 in engagement with the bottom end of the rod 61. The opposite end of cable 69 carries an outwardly threaded freely turnable sleeve 71 on which a lock nut 72 is threadedly mounted, and the sleeve 71 is threaded into a threaded bore 73 formed in the bottom wall of the guide means 14 of the camera indicated in Fig. 2. The sleeve 71 is threaded into bore 73 until plunger 70 extends to a predetermined distance into the guide 14, and then the lock nut 72 is moved into engagement with the bottom end of projection 74 forming an extension of bore 73 so that in this way the Bowden cable 69 is fixed to guide means 14 with plunger 70 extending a desired increment into the guide means 14. A light sensitive slide member 75 is shown in Fig. 2 in the guide means 14 just above the plunger 70. It is evident that just before the slide 75 reaches its lowermost picture taking position it will engage and move the plunger 70 so as to raise the rod 61 and thus move the lever 56 from the position of Fig. 3 against the force of spring 60 toward the position of Fig. 2. The adjustment of cable 69 is such that when slide 75 is in its picture taking position the catch 61a has been raised almost up to the projection 62a of pawl 62 so that the latter does not yet maintain the parts in the position shown in Fig. 2, and at the same time because the catch 61a is almost at the elevation shown in Fig. 2 the shutter is fully closed. In other words, through cable 69 it is possible to maintain the shutter closed with the slide 75 and to release the shutter automatically to spring 60 for automatic opening when slide 75 is moved away from its picture taking position.

The above described structure operates as follows:

The pawl 62 carries a button 76 which extends freely through an opening in housing 59 to the exterior thereof so that when the operator wishes to view through the opening 13 and the shutter is closed he need only press the button 76 to turn pawl 62 in a clockwise direction so as to release catch 61a and thus release bell crank 56 to the force of spring 60 which moves the bell crank 56 from the position of Fig. 2 to that of Fig. 3. A stop 77 is fixed to the front face of wall 17 and engages lever 56, as shown in Fig. 3, to limit the turning thereof by the spring 60. As the lever 56 turns in a clockwise direction to the position of Fig. 3 the motion transmitting member 55 is shifted to the left, as viewed in Fig. 2, and the corner 55b thereof engages corner 51b of lever 51 to turn the latter in a clockwise direction as viewed in Fig. 2 so that the pin 53 also turns to turn the ring 65 and open the shutter. The flag 80 simultaneously moves upwardly beyond frame 20. The stop 77 is so positioned that when it is engaged by lever 56 the shutter is fully open.

Now the operator can compose the picture on the viewing screen, and when he is ready to make an exposure he may manually move the lever 56 back to the position of Fig. 2 where the catch means 62, 61a holds the lever 56 in this position against the force of spring 60. During such turning of lever 56 motion transmitting member 55 shifts to the right, as viewed in Fig. 2, and spring 54 acts on pin 53 to turn the ring 65 in the direction which closes the shutter, the pin 53 engaging the lever 51 to return the latter to the position of Fig. 2 and the flag 80 moving downwardly out of sight.

Now the operator places a light sensitive slide in its picture taking position and removes the covering sheath therefrom. It should be noted that at this time the cable 69 need not be connected to the camera since the operation described is a purely conventional one. However even if cable 69 is connected to the camera it will not in any way influence the operation thereof. With the uncovered slide in picture taking position, the operator acts on plunger 31b to make an exposure in accordance with the time setting regulated by lever 41. As the plunger 31b is thus shifted to the left, as viewed in Fig. 2 the upper left corner of lever 25 engages projection 32b and the leftward shifting of bar 23 against the force of spring 26 causes the ring 32 to turn in a clockwise direction so that the spring 33 becomes tensioned to a greater extent and projection 32d moves away from the rubber stop 35. Projection 32e simply passes beneath a cooperating projection 55c formed at the lower periphery of lever 55 for a purpose described below. In the manner described above the pin 38 cooperates with the projection 40 of the timing mechanism 39. Moreover, as the ring 32 turns in a clockwise direction it pulls the lever 46 to the right so that the roller 47 engages the underside of cam 44 and is turned downwardly away from roller 49 carried by lever 51 until the roller 47 moves to the right beyond the cam 44 when the spring 48 places the top edge of lever 46 in engagement with the roller 49. The spring 48 is not strong enough to turn the lever 51 and only raises the lever 46 into engagement with roller 49 so as to locate the roller 47 at this time at the elevation of the right upper face of cam 44. This operation continues during depression of plunger 31b until the outer periphery of ring 32 just beyond cutout 32a thereof engages the top edge of lever 25 to move the latter out of engagement with the projection 32b. The spring 26 returns slide 23 and the parts carried thereby to their rest position shown in Fig. 2 as soon as the operator releases the plunger 31b. Also, at the precise moment when lever 25 moves beyond projection 32b the strong spring 33 suddenly urges the ring 32 with a substantial force in a counterclockwise direction back toward its rest position. The result is that the roller 47 engages the top edge of cam 44 and rides along this top edge so as to turn the lever 46 in a clockwise direction with respect to ring 32 which is retarded in its return movement in the manner described above by engagement of pin 38 with the lower edge of projecting member 40. The shape of the cam 44 is such that in this way the turning of the lever 46 suddenly turns the lever 51 in a clockwise direction, as viewed in Fig. 2, to suddenly open the shutter and tension the spring 54, the motion transmission member 55 remaining substantially in the position of Fig. 2 but being free to turn slightly at its connection with lever 56 as a result of the turning of lever 51 which remains in engagement with the motion transmitting member 55. The parts are so designed that the pin 38 leaves the tip of member 40 at precisely the same moment that the roller 47 rides over the left tip of cam 44, as viewed in Fig. 2, so that at this precise moment the spring 54 pulls the shutter blades 66 to their closed position and the spring 33 now operates without the retarding force of projecting member 40 to quickly return the ring 32 together with lever 46 to their rest position shown in Fig. 2 where the projecting portion 32d engages the block 35.

In this way, the exposure has been made, and now the operator replaces the sheath on the exposed slide and removes the covered slide from the camera. Then the operator may again press the button 76 to open the shutter and view the image and another exposure may be made in the manner described above. It is evident from the above that the structure of the invention may be operated manually in a conventional manner to take a picture, although it should be noted that in contrast to a conventional arrangement the spring 60 constantly urges the shutter to its open position.

It is, however, possible to operate the camera in a much quicker manner in order to make an exposure. In order to do this the parts are in the position of Fig. 3 where the shutter is open and the operator views the subject through the screen at the rear of the camera. When the operator feels that the subject is about ready to be photographed, with one hand the operator holds a covered slide in a ready position at the top end of the guide 14 to be slipped down in the latter and with the other hand the operator holds the cable 31 ready to press the plunger 31b. It will be noted that at this time the projection 55c of motion transmitting member 55 is in the path of movement of projection 32e of ring 32. At the moment when the operator wishes to make an exposure he depresses plunger 31b so that the projection 32e engages projection 55c and shifts member 55 to the right so as to turn lever 56 in a counterclockwise direction, as viewed in Figs. 2 and 3. The operator does this until he hears the click of catch 61a in projecting portion 62a of pawl 62, so that the operator knows that the shutter is closed. A means is thus provided to enable the operator to very quickly close the shutter with the shutter release cable. As soon as the click is heard, the operator moves into picture taking position the light sensitive slide, removes the sheath therefrom, and proceeds with the depression of plunger 31b to make the exposure in the manner described above. Thus, with this arrangement it is possible to very quickly make an exposure.

It should be noted that with the parts in the position shown in Fig. 3, upward movement of lever 46 is limited by engagement between its roller and the triangular stop shown at the upper left of Fig. 3. As the ring 32 turns in a clockwise direction to shift member 55 to the right, a lever 51 turns in a counterclockwise direction to engage with its roller the lever 46 to turn the latter downwardly so that its roller rides along the lower surface of cam 44 first.

An even faster operation is possible with the use of the cable 69. With this device the operator need not be concerned with depression of the plunger to close the shutter. Simply by placing the slide in its picture taking position the shutter is closed without the catch portion 61 becoming engaged by pawl 62, as was described above. Thus, with this arrangement as soon as the picture is composed on the viewing screen the operator moves the slide to its picture taking position, removes its sheath, depresses plunger 31b to make the exposure, and then need only replace the sheath and remove the slide. This latter very speedy method of operation requires no practice to learn and guarantees against such errors as removing the sheath while the shutter is open. The second of the above methods where the plunger is depressed to close the shutter can be learned after very little practice and results also in a very speedy operation.

It will be understood that each of the elements described above, or two or more together, may also find a useful application in other types of camera differing from the types described above.

While the invention has been illustrated and described as embodied in camera shutter assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic camera, in combination, support means; viewing means carried by said support means adjacent the rear of the camera extending across the optical axis thereof for viewing an image of a subject to be photographed; shutter means movable between open and closed positions and carried by said support means in a position extending across the optical axis and located forwardly of said viewing means, so that the image may be viewed at the latter when said shutter means is in its open position; urging means operatively connected to said shutter means for urging the same by spring action to its open position; guide means carried by said support means between said shutter means and viewing means and adjacent the latter for guiding a light sensitive material holder to and from a picture taking position extending across the optical axis; automatic control means, comprising a Bowden cable having at one end an actuating plunger carried by said support means in a position to be actuated by said light sensitive material holder when the latter approaches its picture taking position, and having the other end operatively associated with the shutter means for automatically placing said shutter means in its closed position against the influence of said urging means when the light sensitive material holder arrives at its picture taking position operating the actuating plunger for releasing said shutter means to said urging means for movement to its open position when said light sensitive material holder is moved away from its picture taking position; and means to make an exposure while said light sensitive material holder is in said picture taking position thereof.

2. For use in a camera, in combination, support means formed with an opening through which the optical axis passes; shutter means carried by said support means for movement between open and closed positions respectively opening and closing said opening; first lever means turnably carried by said support means and operatively engaging said shutter means for moving the same between its closed and open positions; second lever means movably carried by said support means and engaging said first lever means for moving the same between an opening position locating said shutter means in its open position and a closing position locating said shutter means in its closed position and freeing said first lever means for movement independently of said second lever means between said opening and closing positions for respectively opening and closing the shutter means, said second lever means having a portion accessible to the operator so as to be manually operable; urging means acting on said shutter means for urging the same to said open position thereof and acting on said first and second lever means for urging the same toward a position in engagement with each other; spring means connected to said support means and said second lever means for urging the latter to a first position maintaining said first lever means in said opening position thereof; manually releasable catch means engaging said second lever means for maintaining the same against the influence of said spring means in a second position where said urging means locates said first lever means in said closing position thereof; and means operatively connected to said second lever means and actuated by movement of a light sensitive material holder to its picture taking position for locating said second lever means in a position adjacent but short of said second position so that movement of the light sensitive material holder to its picture taking position automatically closes said shutter means, the latter being automatically moved to its open position by said spring means upon movement of the light sensitive material holder away from its picture taking position.

3. For use in a camera, in combination, support means formed with an opening through which the optical axis passes; shutter means carried by said support means for movement between open and closed positions respectively opening and closing said opening; first lever means turnably carried by said support means and operatively engaging said shutter means for moving the same between its closed and open positions; second lever means movably carried by said support means and engaging said first lever means for moving the same between an opening position locating said shutter means in its open position and a closing position locating said shutter means in its closed position and freeing said first lever means for movement independently of said second lever means between said opening and closing positions for respectively opening and closing the shutter means, said second lever means having a portion accessible to the operator so as to be manually operable; urging means acting on said shutter means for urging the same to said open position thereof and acting on said first and second lever means for urging the same toward a position in engagement with each other; spring means connected to said support means and said second lever means for urging the latter to a first position maintaining said first lever means in said opening position thereof; manually releasable catch means engaging said second lever means for maintaining the same against the influence of said spring means in a second position where said urging means locates said first lever means in said closing position thereof; a rod engaging said second lever means; guide means for guiding a light sensitive material holder to and from a picture taking position; and Bowden cable means connected to said support means and guide means and having an elongated shiftable member engaging said rod and extending into the path of movement of the light sensitive material holder as the latter approaches its picture taking position to be shifted by the latter for moving said rod to locate said second lever means in a position where said shutter means is in its closed position and where said second lever means is not engaged by said catch means.

4. For use in a camera, in combination, support means formed with an opening through which the optical axis passes; shutter means carried by said support means for movement between open and closed positions respectively opening and closing said opening; a first lever turnably carried by said support means and engaging said shutter means for moving the same between said open and closed positions during turning of said first lever respectively between opening and closing positions thereof; a second lever turnably carried intermediate its ends by said support means and having one free end portion extending beyond the latter to be accessible to the operator; a motion transmitting member pivotally connected to an end portion of said second lever opposite from said one free end portion thereof and having distant from said second lever a free end located next to said first lever; first spring means operatively connected to said motion transmitting member and acting on said shutter means and first lever for urging the latter and said motion transmitting member to a position engaging each other, said second lever being turnable between an opening position where said motion transmitting member acts on said first lever to locate said shutter means in its open position and a closing position freeing said first lever for movement to its closing position; second spring means acting on said second lever for urging the same to its opening position; catch means carried by said support means and engaging said second lever for maintaining the same against the influence of said second spring means in its closing position; a ring turnably carried for movement about the optical axis by said support means in a position surrounding said opening thereof; a first projection rigid with said ring and a second projection rigid with said motion transmitting member and located in the path of movement of said first projection when said second lever is in its opening position; tripping means carried by said support means and operatively connected to said ring to be actuated thereby, upon turning of said ring in a direction moving said first projection toward said second projection, for turning said first lever from its closing to its opening position and then back to its closing position after said projections engage each other for moving said second lever to its closing position engaged by said catch means, if said second lever is in its opening position upon turning of said ring in said direction; third spring means engaging said ring for urging the same to a rest position from which said ring moves in said direction; and manually operable means for turning said ring through a given angle in said direction and then automatically releasing said ring to be returned to its rest position by said third spring means.

5. A structure as recited in claim 4 and wherein said tripping means includes an elongated means pivotally connected at one end to said ring, having a side edge directed toward said first lever, and having distant from said ring a free end portion; and cam means engaging said free end of said elongated means during return of said ring to its rest position for moving said side edge of said elongated means into engagement with said first lever to turn the latter from said opening to said closing position thereof.

6. In a photographic camera, in combination, a guide for a light sensitive, picture taking slide; an automatic shutter; first spring means operatively connected to said shutter for urging the latter to the closed position thereof; control lever means operatively connected to said shutter for opening the latter independently of said timing mechanism; an actuating lever operatively connected to said control lever means for operating the latter; second spring means operatively connected to said actuating lever for urging the latter to a position where said shutter is opened, said actuating lever being adapted to be manually moved against the action of said second spring means to a rest position where said shutter is closed; a spring loaded pawl engaging said actuating lever when the latter is in said rest position thereof for automatically holding the latter in said rest position; manual release means operatively connected to said pawl for moving the latter to a release position releasing said actuating lever to the action of said second spring means for opening said shutter; transmission means connected to said actuating lever and to said guide for automatically moving said actuating lever in the direction which closes said shutter when a light sensitive slide is moved into a picture taking position, said transmission means being limited to move said actuating lever through a distance less than that required to engage said actuating lever with said pawl so that when the slide is removed from the camera the shutter automatically moves back into its open position.

7. In a camera as defined in claim 6, said actuating lever being pivotally connected at one end to a link having a cam-shaped end engaging said control lever means and being shaped in such a way that said link turns during actuating of said control lever means; an adjustable automatic timing mechanism for adjusting the shutter to different exposure times; a turnably mounted shutter blade control ring connected to said timing mechanism and control lever means; a stop located adjacent to said ring; third spring means operatively connected to said ring for urging the latter against said stop; cable release means for turning said ring against the action of said third spring means and for then automatically releasing said ring to open and close said shutter for exposing a photographic plate; a first projection forming part of said link and being located in the path of movement of a second projection forming part of said ring when said actuating lever is in the position where said shutter is open so that actuation of said cable release means moves said second projection against said first projection to turn said link and said actuating lever therewith to move the latter back to its rest position where it is engaged by said pawl to be automatically maintained by the latter in said rest position.

8. In a camera as defined in claim 6, said transmission means being in the form of a Bowden cable.

9. In a camera as defined in claim 6, a signal flag movably mounted in the housing of the camera and being connected to said control lever means and extending from said housing when said shutter is open so as to give a visual indication of the position of said shutter, said signal flag disappearing into said camera housing when said shutter is closed.

10. In a camera as defined in claim 6, including a ground glass viewing plate, with said actuating lever, said release means for said pawl, and an adjusting lever for said timing mechanism all being adjustable from the ground glass side of the camera as well as from the objective side of the camera, a signal flag visible from the ground glass side of the camera as well as the objective side of the camera, and said adjusting lever for the timing mechanism coperating with indicia also visible from the ground glass side of the camera as well as the objective side of the camera.

References Cited in the file of this patent
UNITED STATES PATENTS

| 1,525,741 | Hutchings | Feb. 10, 1925 |
| 2,397,742 | Kals | Apr. 2, 1946 |
| 2,424,176 | Kals | July 15, 1947 |